US012715434B2

(12) United States Patent
Wadman et al.

(10) Patent No.: US 12,715,434 B2
(45) Date of Patent: Aug. 25, 2026

(54) METHOD AND DEVICE FOR ESTIMATING A REGION OF SPACE OCCUPIED BY A MOVING VEHICLE

(71) Applicant: Volvo Autonomous Solutions AB, Gothenburg (SE)

(72) Inventors: Rikard Wadman, Gothenburg (SE); Oliver Sundell, Gothenburg (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 5 days.

(21) Appl. No.: 18/833,566

(22) PCT Filed: Feb. 4, 2022

(86) PCT No.: PCT/EP2022/052658
§ 371 (c)(1), (2) Date: Jul. 26, 2024

(87) PCT Pub. No.: WO2023/147867
PCT Pub. Date: Aug. 10, 2023

(65) Prior Publication Data
US 2025/0136104 A1 May 1, 2025

(51) Int. Cl.
*B60W 30/10* (2006.01)
*B60W 60/00* (2020.01)
*G08G 1/16* (2006.01)

(52) U.S. Cl.
CPC ........ *B60W 30/10* (2013.01); *B60W 60/0015* (2020.02); *G08G 1/166* (2013.01); (Continued)

(58) Field of Classification Search
CPC ............. B60W 30/10; B60W 60/0015; B60W 2300/14; B60W 2552/40; B60W 2555/20; G08G 1/166; G08G 1/0129; G08G 1/0112
See application file for complete search history.

(56) References Cited

U.S. PATENT DOCUMENTS 10,994,729 B2 * 5/2021 Berntorp ............. B60W 40/105
11,407,415 B2 * 8/2022 Austin ................. G06V 20/584
(Continued)

FOREIGN PATENT DOCUMENTS

CN 108389430 A 8/2018
WO 14148989 A1 9/2014

OTHER PUBLICATIONS

Zhao et al.; Confidence Intervals of the Generalized Pareto Distribution Parameters Based on Upper Record Values; 2019 (Year: 2019).*

(Continued)

*Primary Examiner* — Kurt Philip Liethen
(74) *Attorney, Agent, or Firm* — Jeffri A. Kaminski; Venable LLP

(57) ABSTRACT

A method for estimating a region of space occupied by a vehicle which moves along a path includes: obtaining a nominal path $\{X(s):0\le s\le s_0\}$; recording a plurality of trajectories in the vehicle's state space $\{x(s;q):0\le s\le s_0\}$ while the vehicle is maneuvered along the nominal path in a variety of driving conditions q; for each trajectory, computing a corresponding lateral deviation $\{e(s;q)=(e_l(s;q),e_r(s;q)): 0\le s\le s_0\}$ off the nominal path; estimating a conditional probability distribution $F_{e(s)|X(s)}$ of the lateral deviation given the nominal path; and based on the estimated probability distribution, providing an outer limit of a region of space $A_X$ occupied by the vehicle, wherein the computing of the lateral deviation and/or the providing of the outer limit is based on a footprint of the vehicle.

17 Claims, 4 Drawing Sheets

(52) U.S. Cl.
CPC ..... *B60W 2300/14* (2013.01); *B60W 2552/40* (2020.02); *B60W 2555/20* (2020.02)

(56) References Cited

U.S. PATENT DOCUMENTS

| | | | | |
|---|---|---|---|---|
| 11,747,806 | B1 * | 9/2023 | Wootton | G08G 1/161 701/28 |
| 11,941,989 | B2 * | 3/2024 | Chen | G08G 1/167 |
| 11,945,472 | B2 * | 4/2024 | De Francesco | G08G 1/096844 |
| 12,415,510 | B1 * | 9/2025 | Funke | B60W 30/095 |
| 2015/0170514 | A1 | 6/2015 | Stenneth | |
| 2017/0010120 | A1 * | 1/2017 | Shashua | G08G 1/0112 |
| 2017/0329328 | A1 * | 11/2017 | Horita | B60W 50/14 |
| 2019/0126921 | A1 | 5/2019 | Gwin et al. | |
| 2019/0143963 | A1 | 5/2019 | Schlegel et al. | |
| 2019/0179316 | A1 * | 6/2019 | Siskind | G06F 40/30 |
| 2019/0294167 | A1 * | 9/2019 | Kutila | G08G 1/096827 |
| 2020/0050196 | A1 * | 2/2020 | Liao-Mcpherson | G05B 13/048 |
| 2020/0307437 | A1 * | 10/2020 | Thieberger | G05D 1/6985 |
| 2021/0370980 | A1 * | 12/2021 | Ramamoorthy | G08G 1/0116 |
| 2021/0380099 | A1 | 12/2021 | Lee et al. | |
| 2022/0063621 | A1 * | 3/2022 | Austin | G06V 20/584 |

OTHER PUBLICATIONS

International Search Report and Written Opinion of the International Searching Authority in corresponding International Application No. PCT/EP2022/052658 mailed Sep. 16, 2022 (15 pages).

Written Opinion of the International Preliminary Examining Authority (Second Written Opinion) in corresponding International Application No. PCT/EP2022/052658 mailed Aug. 8, 2023 (8 pages).

International Preliminary Report on Patentability in corresponding International Application No. PCT/EP2022/052658 mailed May 17, 2024 (9 pages).

* cited by examiner

METHOD AND DEVICE FOR ESTIMATING A REGION OF SPACE OCCUPIED BY A MOVING VEHICLE

CROSS-REFERENCE TO RELATED APPLICATIONS

This application is a U.S. National Stage application of PCT/EP2022/052658, filed Feb. 4, 2022 and published on Aug. 10, 2023, as WO 2023/147867, all of which is hereby incorporated by reference in its entirety.

TECHNICAL FIELD

The present disclosure relates to the field of autonomous vehicles. In particular, it provides a method for estimating a region of space occupied by a vehicle when it moves along a path, which enables efficient route planning of vehicles that share a common navigable space.

BACKGROUND

WO2014148989 discloses a method in which a trajectory for a single vehicle is determined in such manner that the vehicle maintains a dynamic safety margin relative to an obstacle in the vehicle's proximity. The safety margin, which is dependent on measured road friction and the velocity of the vehicle, may be an arbitrary function specified by the vehicle developer such that the risk of hitting the obstacle is "low".

The present disclosure addresses the related problem of providing accurate estimates of the region of space occupied by a vehicle which moves along a predefined path.

SUMMARY

One objective of the present disclosure is to make available a method for estimating the region of space occupied by a vehicle which moves along a path. Another objective is to enable such estimation in terms of (two- or three-dimensional) confidence intervals for a desired confidence level. A further objective is to enable varying climatic conditions to be compensated. A further objective is to make this estimation method compatible with probability-based risk management methodologies, e.g., by being linked in a transparent fashion to probabilistic analysis. A further objective is to enable trajectory data recorded on one site to be reused for estimating the space occupied by a similar vehicle which operates in equivalent topographic conditions on the same site or a different site. A still further objective is to provide an estimation method that is generalizable to vehicle combinations. The estimation method should preferably be such as to support path planning targeting multiple vehicles that share a common navigable (drivable) space.

At least some of these objectives are achieved by the invention as defined by the independent claims. The dependent claims relate to embodiments of the invention.

In a first aspect of the invention, there is provided a method for estimating a region of space $A_X$ occupied by a vehicle which moves along a path. The method comprises: obtaining a nominal path $\{X(s):0 \le s \le s_0\}$; recording a plurality of trajectories in the vehicle's state space $\{x(s;q): 0 \le s \le s_0\}$ while the vehicle is maneuvered along the nominal path in a variety of driving conditions q; for each trajectory, computing a corresponding lateral deviation $\{e(s;q)=(e_l(s;q), e_r(s;q)):0 \le s \le s_0\}$ off the nominal path; estimating a conditional probability distribution $F_{e(s)|X(s)}$ of the lateral deviation given the nominal path; and based on the estimated probability distribution, providing an outer limit of a region of space $A_X$ occupied by the vehicle. A known footprint Π of the vehicle may be used to compute the lateral deviation (if the lateral deviation makes reference to the outer limits of the vehicle, i.e., with account taken of the footprint) and/or to provide the outer limit of $A_X$ (if the lateral deviation has been computed with reference to the vehicle center or another reference point on the vehicle).

The method provides an estimate of the region of space to be occupied by the vehicle when it moves along the path in operation. The more similar the overall operating conditions (including driving conditions, strategies of maneuvering the vehicles etc.) are to the conditions during the recording, the more reliable the estimate will be. Because the lateral deviation is modeled as a probability distribution, it is easy to adapt the calculation of the outer limit as a function of a currently desired confidence level. Further, the method according to the first aspect of the invention has a transparent and stable relationship to probabilistic quantities, and so it can be easily integrated into widely used risk management practices.

In one embodiment, the outer limit is a p-confident upper bound on the occupied region of space for a predefined confidence level p. Such an upper bound can be provided, for instance, by evaluating a Pareto-type distribution.

In one embodiment, the outer limit is provided by computing an upper bound on the lateral deviation at a plurality of points along the nominal path. Interpolation between these may be applied, or their convex hull or alpha shape may be formed. If the lateral deviation has been computed without regard to the footprint Π of the vehicle, the footprint is applied to said upper bound, whereby the outer limit is obtained. The footprint Π may be applied by a superposition operation and/or by convolving the upper bound with an indicator function $\mathbf{1}_\Pi$ of the footprint.

Regarding the modeling of the vehicle, it is noted that some embodiments provide that the state space shall include the orientation of the vehicle. Further, the driving conditions q may include weather, precipitation, temperature, wind speed, road friction, lighting, load, radio conditions, hardware health, and/or the time elapsed since calibration.

One embodiment provides an estimate of the occupied space when a vehicle combination moves along a path, wherein the vehicle combination has at least two vehicle units with respective footprints. This is achieved by recording independent trajectories for all vehicle units. Next, the subsequent steps leading up to the outer limit are executed independently for the respective vehicle units. The locally outermost one of the respective outer limits thus obtained is then used as an outer limit of the region of space occupied by the vehicle combination.

In one embodiment, data recorded for one nominal path can be used for providing a predictive outer limit of a region of space when the vehicle (or a vehicle which is similar as to its dimension and dynamics) which moves along a different path.

In one embodiment, the estimation method outlined above is used to support path planning of multiple autonomous vehicles (AVs). For this purpose, a planned path $X_1$ of a first AV is obtained; an outer limit of a region of space $A_{X_1}$ occupied by the first AV when it moves along the planned path is estimated by the above method; and non-colliding path planning for a second AV is initiated on the basis of the estimated outer limit, to provide a path $X_2$ for the second AV.

The invention further relates to a computer program containing instructions for causing a computer, or an autonomous vehicle control arrangement in particular, to carry out the above methods. The computer program may be stored or distributed on a data carrier. As used herein, a “data carrier” may be a transitory data carrier, such as modulated electromagnetic or optical waves, or a non-transitory data carrier. Non-transitory data carriers include volatile and non-volatile memories, such as permanent and non-permanent storages of the magnetic, optical or solid-state type. Still within the scope of “data carrier”, such memories may be fixedly mounted or portable.

For purposes of the present disclosure, a “path” refers to a curve in two- or three-dimensional cartesian space (notation: boldface uppercase), whereas “trajectory” refers to a curve in state space (notation: boldface lowercase). Generally, all terms used in the claims are to be interpreted according to their ordinary meaning in the technical field, unless explicitly defined otherwise herein. All references to “a/an/the element, apparatus, component, means, step, etc.” are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

Figure 4:
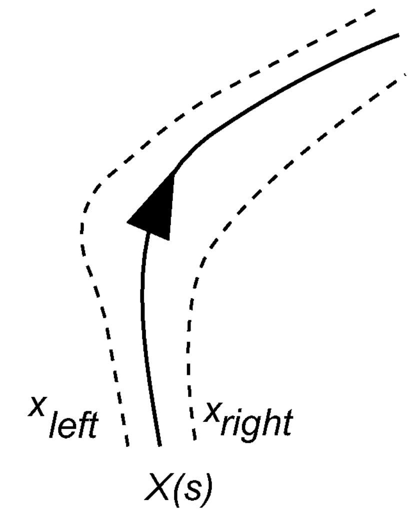
Figure 4:
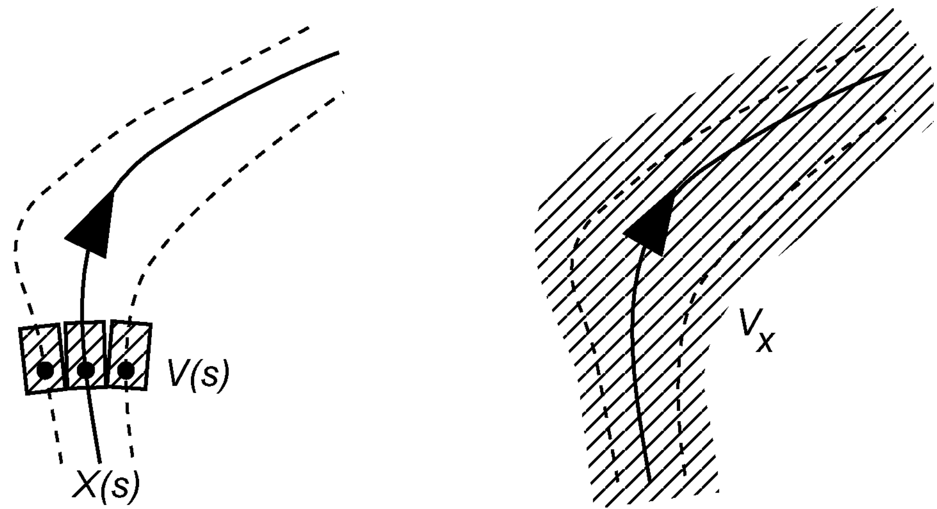

the top panel of FIG. 4 illustrates a two-dimensional path X(s) and the outer limits $x_{left}$, $x_{right}$ of a region of space occupied by a vehicle which moves along the path;

the lower left panel of FIG. 4 illustrates an occupied volume V(s) as a function of path length s, being the union of the vehicle footprint applied on the two-dimensional path X(s) and said outer limits $x_{left}$, $x_{right}$; and the lower right panel of FIG. 4 illustrates a total occupied volume Vx occupied by the vehicle moving along the path X.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1:
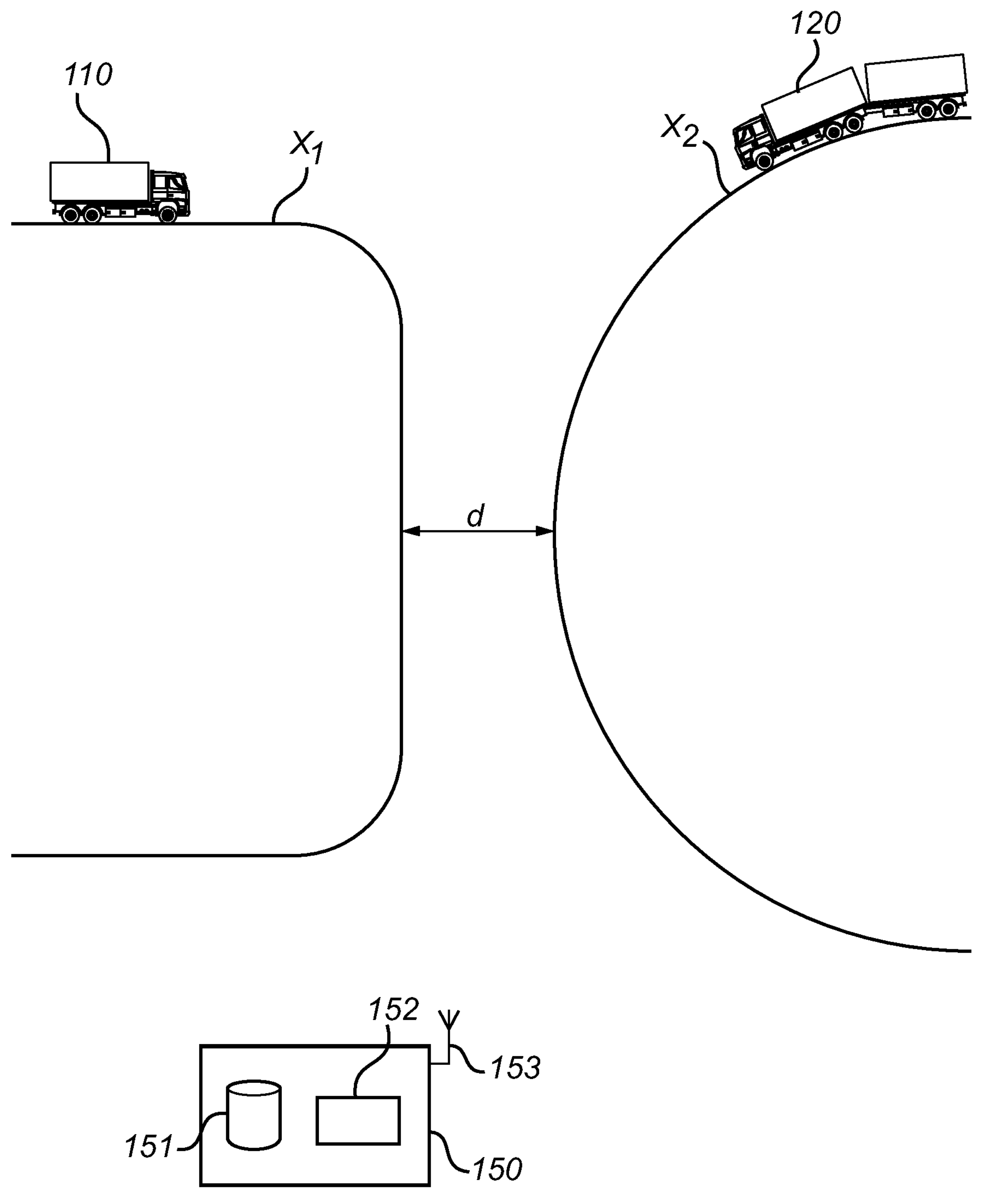
FIG. 1 shows two vehicles (including one vehicle combination) which move along paths determined by an external controller, which paths are separated by a distance d.

FIG. 1 shows one single-unit vehicle 110 and one vehicle combination 120 with multiple vehicle units which move in a navigable space along respective nominal paths $X_1$, $X_2$ determined by an external controller 150. The external controller 150 may comprise memory 151, processing circuitry 152 and a wireless interface 153 enabling it to send path-related instructions to the vehicles 110, 120.

Preferably, the navigable space is a confined area, where normally no other traffic is present. The vehicles 110, 120 may be autonomous vehicles (AVs). AVs in confined areas typically perform transport missions. To complete a mission of this type, a vehicle needs to visit a number of key points for loading, processing, servicing, unloading etc., which might require highly accurate positioning and/or navigation, and optionally in combination with bucket operation, tipping, and the like.

The nominal paths $X_1$, $X_2$ may have been provided in view of optimal productivity, e.g., to be possible to traverse in limited time, with a controlled risk of colliding with static obstacles or other AVs. To allow this, the present disclosure addresses the problem of estimating the AV's occupied area in operation, which in turn allows a well-informed determination of a suitable distance d between said paths $X_1$, $X_2$. The distance d should be large enough to ensure that collisions between the vehicles occur with at most a predefined probability, yet not excessive in a manner that would prevent efficient use of the navigable space. Indeed, from this latter point of view, it could be desirable to pack the paths as densely as possible.

Figure 2:
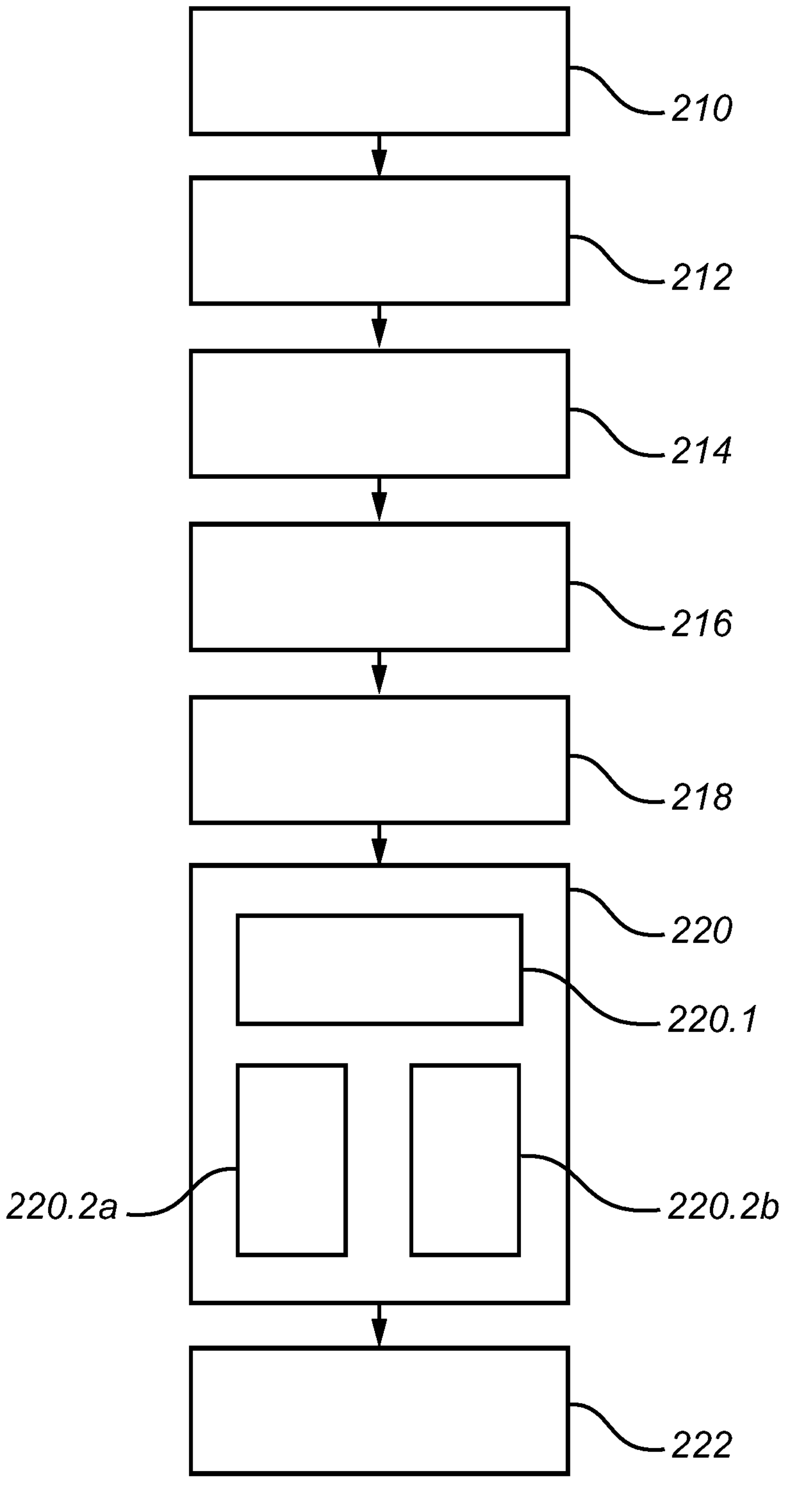
FIG. 2 illustrates, in the form of a flowchart, methods according to various embodiments of the invention.

With reference to FIG. 2, there will now be described a method 200 for estimating a region of space occupied by a vehicle which moves along a nominal path $\{X(s):0\leq s\leq s_0\}$ during operation. The vehicle is modeled as a dynamical system in discrete or continuous time. As mentioned, a “path” refers to a (discrete or continuous) curve in two- or three-dimensional cartesian space, and a “trajectory” is a (discrete or continuous) curve in state space. In a discrete-time representation, physical (continuous) time is segmented into epochs of equal duration which are represented by values of a discrete variable k. The model includes a definition of a state $x_k$, a control input $u_k$, vehicle dynamics $x_{k+1}=f(x_k, u_k)$ and a position operator h which maps each state $x_k$ to a position $X_k$. The position operator h may optionally depend on the control input $u_k$ and it may optionally output a further quantity, such as the vehicle's orientation (or heading, or pose). The vehicle dynamics f may be represented by a linear or nonlinear function; the vehicle dynamics f may in particular be non-holonomic. The state $x_k$ comprises relevant aspects of the vehicle's current condition. It may be composed of the vehicle's position, orientation, velocity, curvature or other kinematic quantities, and may further comprise internal parameters such as steering angle, articulation angle (of a vehicle combination), status of propulsion means, brakes and other conditions prevailing in various technical systems in the vehicle, including the drivetrain. Similarly, a control input $u_k$ may represent a momentary actuation of a technical system in the vehicle, including accelerating, braking, increasing/decreasing a steering angle. Although the exact definition of the state space is not essential to the invention, it should preferably contain at least the vehicle's position and orientation.

In one embodiment, the method 200 begins with a step 212 of obtaining a nominal path $\{X(s):0\leq s\leq s_0\}$, where s denotes the path length or another discrete or continuous variable that parametrizes the path. If the path is obtained in non-parametric form, e.g. as a sequence of control points or splines, it can be converted into parametric form by per se known methods. Without departing from the scope of this disclosure, the nominal path may be obtained as components of a nominal trajectory in state space (i.e., embedded into state space); the implementer of the method 200 is free to decide whether to just extract the cartesian components from the nominal trajectory or to utilize the non-cartesian components for guidance, verification or similar purposes.

In a next step 214, a plurality of trajectories in the vehicle's state space $\{x(s;q):0\leq s\leq s_0\}$ are recorded while the vehicle 110 is maneuvered along the nominal path in a variety of driving conditions q. The recording 214 may include reading trajectory-relevant data from sensors mounted on the vehicle 110. The recording 214 may be performed while the vehicle performs a productive transport mission, or alternatively a dedicated preliminary recording phase may be allocated. The driving conditions may be represented as a vector of parameters representing weather, precipitation, temperature, wind speed, road friction, lighting, load, radio conditions (which could affect the reception of a cellular or satellite positioning signal), hardware health (including actual or simulated aging) and/or time elapsed since a calibration of a positioning or navigation system in the vehicle 110. The driving conditions in which the trajectories are recorded 214 should fairly represent the expected variation of these conditions to which the vehicle is exposed in operation. For example, if a fleet of vehicles in 24-hour operation is considered and the variations in daylight are expected to influence the positioning/navigation accuracy, the trajectories should preferably be recorded at different times, such as day, night, dawn and dusk. Similarly, in an outdoor environment, it is important to record trajectories for both dry and wet roadway.

The recording 214 can include performing measurements on a vehicle which is automatically controlled according to a control strategy. The control strategy may be implemented as an optimal control problem (OCP) that is subject to a penalty for deviating from the nominal path X. For example, the OCP may include optimizing a target function that penalizes deviations from the nominal path. This way, un-wanted behaviors, including intentional 'shortcutting', can be controlled or eliminated. What the recording step 214 is intended to capture is the deviations that occur despite an earnest effort to keep the vehicle on the nominal path. The target function may further include a penalty on the time spent traversing the nominal path X (this favors productivity), a penalty on energy consumption, mechanical wear, potentially dangerous maneuvers and the like. The resulting estimate of the region of space occupied will be more accurate if, in operation, the vehicle is controlled according to an identical or similar strategy.

Alternatively, the recording 214 takes place while the vehicle is manually controlled. For example, a human driver of the vehicle can be given an instruction to make best efforts to follow the nominal path, subject to an optional time constraint. The estimate of the occupied region of space will be all the more reliable if the driver obeys an identical or similar instruction during operation.

Figure 3:
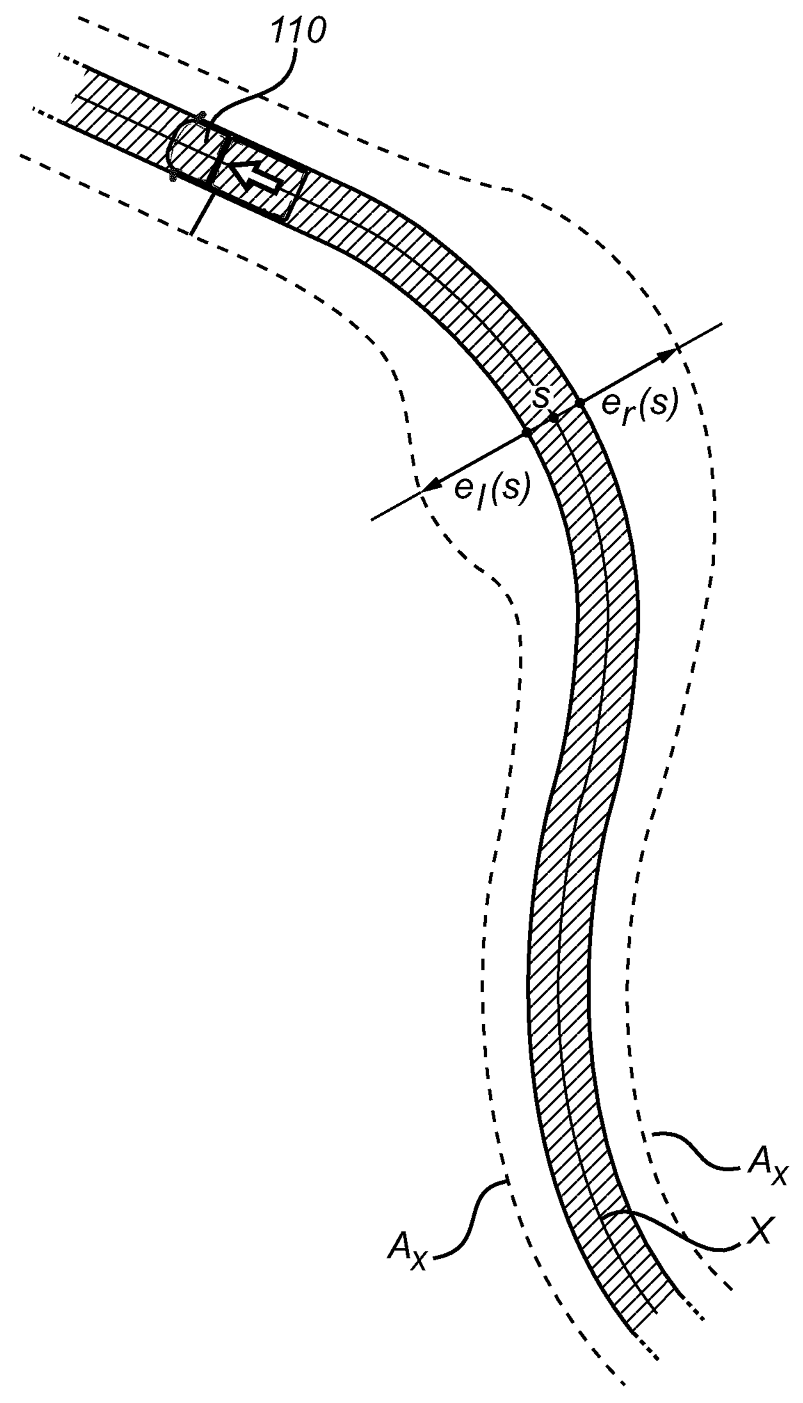
FIG. 3 shows a nominal path X represented as a curve parametrized by a variable s, left and right lateral deviations $e_l(s)$,$e_r(s)$ and outer limits of a region of space $A_X$ occupied by a vehicle which moves along the nominal path X.

In a next step 216 of the method 200, each trajectory $\{x(s;q):0\leq s\leq s_0\}$ is analyzed with respect to the lateral deviation of the vehicle 110, to obtain a left $e_l(s;q)$ and right $e_r(s;q)$ deviation. The right and left deviation may be written as a vector $e(s;q)=(e_l(s;q),e_r(s;q))$. As mentioned, the deviations occur as a result of inadequate road friction, inaccurate positioning/navigation, mechanical imperfections and other random factors. The deviations may be expressed parametrically with respect to the variable s. The significance of the two deviation functions is seen in FIG. 3. Here, the deviation at point s is measured in directions orthogonal to the momentary tangent of the path, X'(s); this orthogonal direction corresponds approximately to the transverse coordinate axis of the vehicle's 110 moving reference frame. According to a first option, the left and right deviations refer to the outer limits of the vehicle 110, i.e., using knowledge of the vehicle's 110 footprint Π, preferably with due account of the vehicle's 110 momentary pose at each point of the trajectory. The footprint Π may be a two- or three-dimensional point set. According to a second option, the left and right deviations refer to a reference point on the vehicle, such as the center of gravity, ground-plane barycenter, centerline, or rear midpoint.

In a next step 218, a conditional probability distribution $F_{e(s)|X(s)}$ of the lateral deviation given the nominal path is estimated. The probability distribution can be represented as a cumulative distribution function (cdf), a probability density function (pdf) or in any other suitable form. The estimation can use any suitable statistical estimation method, such as a frequency-based or histogram-based approach. The estimation may be subject to a hypothesis that the deviations are distributed according to a Pareto-type distribution, or the generalized Pareto distribution in particular.

Based on this estimated conditional probability distribution $F_{e(s)|X(s)}$ of the lateral deviation, in a step 220, an outer limit of a region of space $A_X$ occupied by the vehicle is provided. This outer limit is composed of the curves $x_{left}$ and $x_{right}$ in the upper panel of FIG. 4, and it is indicated by dashed line in FIG. 3 and in the lower left panel of FIG. 4.

If step 216 has been performed according to the first option, the provisioning of the outer limit is a straightforward evaluation of the conditional probability distribution. For example, if the outer limit is to be a p-confident upper bound on the occupied region of space $A_X$, for a predefined confidence level p, the outer limit is chosen such that it encloses a total probability mass of p, given the nominal path. "Upper" in this context does not refer to a direction but to signifies that the outer limit encloses a region of space large enough to contain the actual region of space $A_X$ with confidence p. If the conditional probability distribution has been estimated as a Pareto-type distribution, step 220 will include evaluation such a distribution. To compute the outer limit, one may evaluate the probability distribution to obtain upper bounds on the lateral deviation at discrete points $\bar{s}_1$, $\bar{s}_2$, . . . , that is, upper bounds on $e(\bar{s}_1;q)$, $e(\bar{s}_2;q)$, . . . . For example, one may take $$e_{\max}(\bar{s}_1;q)=F^{-1}_{e(s)|X(s)}(p\mid x(s)),$$

where 1−p represents the acceptable risk (a probability). The outer limit may then be provided by interpolation, e.g., as a curve which connects these discrete upper bounds, or a smoothed version of such a curve.

If the step 216 has been performed according to the second option, the lateral deviation (just like its probability distribution) is independent of the footprint Π of the vehicle 110. Step 220 will then include a substep 220.2*a* of applying the footprint Π to the upper bound. If the above-mentioned approach, where discrete upper bounds are computed 220.1 at a plurality of points along the nominal path X(s) and then interpolated, the footprint Π may be applied 220.2*a* to each of the discrete upper bounds. In detail, the footprint Π may be superposed (conceptually 'stamped') at each point in accordance with the vehicle's momentary orientation, after which the method 200 applies interpolation, or it forms the convex hull or the alpha shape for suitable α. Alternatively, the outer limit of the occupied region of space $A_X$ having been computed for the reference point is convolved with an indicator function $\mathbf{1}_\Pi$ of the footprint, and the convex hull of the convolution (a two-dimensional point set) is formed. Additionally, a convolution of the nominal path X and said indicator function $\mathbf{1}_{\Pi}$ of the footprint can be included in the basis for computing the convex hull or alpha shape. This alternative approach ignores the momentary orientation of the vehicle and is therefore likely to provide an approximate, slight overestimation of the outer limit. It is illustrated in the lower left panel of FIG. 4, and a possible result is shown in the lower right panel.

A few generalizations of the method 200 will be briefly mentioned.

To perform the method 200 for a vehicle which is a combination of multiple units (for instance, the second vehicle 120 in FIG. 1), the recording step 214 can be performed jointly for all vehicle units. The joint performance of the recording step 214 may include maneuvering the vehicle combination in the coupled state while reading trajectory-relevant data from sensors mounted in the respective vehicle units. While the vehicle units are coupled, such as in a tractor-trailer combination, it may be sufficient to actively control just the leading vehicle. The next three steps 216, 218 and 220, however, are performed independently for the respective vehicle units, so that different lateral deviations, conditional probability distributions and outer limits are obtained. The locally outermost one of the respective outer limits can then be used as an outer limit of the region of space occupied by the vehicle combination in operation. Constructively, it may be determined for each s value which one of the outer limits deviates the farthest (in the normal direction) from the nominal path X.

A second generalization is to apply a three-dimensional footprint Π of the vehicle 110, whereby the region of space $A_X$ that the vehicle occupies will be three-dimensional. It is recalled that the use of a two-dimensional footprint produces a two-dimensional region of space $A_X$. For example, if the vehicle has a non-flat top as a result of comprising a driver cab, crane, flatbed or the like, the lateral deviation above a certain height could have a considerable dependence on the momentary vehicle orientation. Even according to this generalization, the trajectories are recorded with an understanding that the vehicle rests on the ground at all times. Thus, the vertical variation in the region of space relative to the ground will primarily be due to the application of the footprint with various orientations.

A third generalization is to consider only the area occupied by the wheels. This would allow safe maneuvering on narrow roads, wherein parts of the vehicle body may have to be allowed to protrude outside the road edge.

Yet another generalization is to use a conditional probability distribution, which has been estimated on the basis of trajectories recorded for one nominal path $\{X(s):0\le s\le s_0\}$, for the additional purpose of estimating the space occupied when the vehicle moves along a different nominal path $\{\tilde{X}(s):0\le s\le s_0\}$. Still further, a conditional probability distribution, which has been estimated on the basis of trajectories recorded for a first vehicle that is maneuvered along one nominal path, can be used to estimate the space occupied when a different vehicle moves along the same or a different nominal path in operation. In both cases, the estimation will be all the more accurate the more faithfully the set of driving conditions during the trajectory recording reflets the range of conditions during operation. This similarity in driving conditions may be achievable even if the nominal paths are located on different geographical sites. Likewise, the estimation will be all the more accurate the more similar the two vehicles are, e.g., of same model, same type or with comparable dynamical characteristics.

For additional understanding, there will now be presented an alternative description of the method 200 in group formalism. Like previously, the aim is to determine a corridor delimited by the curves $x_{left}$, $x_{right}$ (see FIG. 4) of maximal allowed lateral tracking errors (or lateral deviations) by translating the nominal path X(s) in the positive and negative y direction (normal direction of the path) in the frames of each vehicle body, until either the resulting pose is just outside the drivable area or it is almost certain that the vehicle will remain within the resulting corridor when it moves along the path in operation. In other words, the lateral deviation in this example refers to the outer limits of the vehicle body rather than to a reference point on the vehicle.

A nominal path of length s, for a tractor-trailer combination is considered:

$$X: [0, s_0] \to \mathcal{M},$$

where $\mathcal{M}$ is a group manifold. To describe the movement of two ideally rigid bodies in three-dimensional space, $\mathcal{M}$ is taken to be $SE(3)\times SE_{(3)}$, with SE(m) being the special Euclidean group in m dimensions, that is, the group of combined translations and rotations in $\mathbb{R}$ m. Define $x(s)=(x_1(s), x_2(s))$, where $x_i(s)\in SE(3)$ represents the position and orientation relative to the map coordinate origin of the ith body in the vehicle combination. As an element $g\in SE(3)$ can be parametrized in terms of a translation part $x\in\mathbb{R}^3$ and a rotation part $\psi\in SO(3)$, the following component notation can be used:

$$g=(x, \psi)=(x, y, z, \psi_x, \psi_y, \psi_z).$$

The symbol g with an index represents extraction of a single component, e.g., $g_y=y$. The relative transform from an element g to $\hat{g}$ can be written $\Delta g=g^{-1}\hat{g}$, so that $\hat{g}=g\Delta g$ holds. Since $\mathcal{M}$ is a product group, the operation of extracting a factor commutes with group multiplication, that is, $(g\hat{g})_i=g_i\hat{g}_i$; for any g, $\hat{g}\in\mathcal{M}$, where $g_1\in SE(3)$ denotes the ith factor group element of g. It will be assumed that the respective s coordinates of the paths x(s), $\hat{x}(s)$ have been lined up and truncated so that $$\left(x^{-1}(s)\hat{x}(s)\right)_{1,x}=0,\ \forall\, s\in[0, s_0].$$

Accordingly, the perceived tracking error at each point is $$\Delta x(s)\equiv x^{-1}(s)\hat{x}(s),$$

that is, $\Delta x(s)$ is defined as a transform which maps x(s) to $\hat{x}(s)$ when acting from the right.

The ith body of the vehicle is assumed to be contained in a finite point set $\Pi_i\subset\mathbb{R}^3$ (footprint), where each point $p\in\Pi_i$ is equivalent to a translation measured in the coordinate system of the vehicle body. These translations are then trivially mapped onto a set of group elements $P_i\in SE(3)$ by letting $P_i=\{(p,0):p\in\Pi_i\}$. The position in the map coordinate system of a point $p\in\Pi_i$ then becomes simply $(xp)_x$, where x is the transform from the map coordinate system to the coordinate system of the body. One may then write the tracking error for a particular point as $$\Delta p_{i,p}(s) = (x_i(s)p)^{-1}\hat{x}_i(s)p = p^{-1}x_i^{-1}(s)\hat{x}_i(s)p = p^{-1}\Delta x_i(s)p,$$

and, by extension, the set of point tracking errors for the ith body may be written $$\Delta P_i(s) = \{\Delta p_{i,p}(s):\ p \in P_i\}.$$

Since it is unknown which point on the vehicle will first cause a collision, an overall statistic of the lateral error will be used. As said statistic, for example, one may use either the absolute value of the y component of the point that deviates most:

$$\Delta y_{abs,i}(s) \equiv \max_{\Delta p \in \Delta P_i(s)} |\Delta p_y|$$

or just the y component of the points that deviate the most in the positive and negative y directions, respectively:

$$\Delta y_{max,i}(s) \equiv \max_{\Delta p \in \Delta P_i(s)} \Delta p_y,$$

$$\Delta y_{min,i}(s) \equiv \min_{\Delta p \in \Delta P_i(s)} \Delta p_y.$$

A goal is now to determine the appropriate size of the corridor surrounding a nominal path, such that the corridor is followable. The corridor shall be followable in the sense that the risk that a vehicle which moves along the nominal path departs from the corridor laterally in operation is negligible, say, has a probability of at most 1−p. To achieve this, the selected statistic (e.g., $\Delta y_{abs,i}(s)$) is viewed as a stochastic process $Y_{v,r,i}(s)$ for each body i and each separate run r of each vehicle v in the fleet. These processes may be predicted by a set of predictors $X_{v,r,i}(s)$ which, for the purpose of the corridor estimation, can be assumed to be any information available from the path that the vehicle is operating along, such as planned velocity and planned curvature. It is assumed that the processes $Y_{v,r,i}(s)$ are stationary and i.i.d. between vehicles and runs, so that $Y_{v,r,i}(s) \sim Y$ for some random variable Y. The problem can thus be rephrased as that of finding a function $\hat{y}(x)$ such that $$Prob[Y > \hat{y}(x)] < 1 - p.$$

By the stationarity assumption, Y(s) and Y(s+δ), δ>0, are identically distributed but not necessarily independent. To allow statistical analysis, the data points need to be independent, which can be achieved through block declustering, wherein the processes are divided into equal intervals each of a length that justifies the assumption that they are essentially statistically independent from one another.

A simplifying assumption at this stage is to take $\hat{y}(x) \equiv f_0(x)+\alpha$, where $f_0(x)$ is an arbitrary function with suitable properties, e.g., its derivative may be assumed to be positive-definite in directions of increasing curvature and velocity. Further, α is an arbitrary constant. One may then define $\tilde{Y} \equiv Y - f_0(X)$, which transforms the above condition into $$Prob[\tilde{Y} > \alpha] < 1 - p.$$

This restricts attention to α.

Next, to find the occupied area, a single-body trajectory $x(s) \in SE(m)$ with corridors $x_{left}(s)$ and $x_{right}(s)$ is considered (see the top panel of FIG. 4) with the body modeled as a set of points Π. The occupied volume of the trajectory is given by $$V_x = \bigcup_s V(s),$$

where V(s) is the occupied volume at point s. A simple formalization of V(s), which is exact or near-exact for cuboid, spherical and other simple body shapes, is $$V(s) = C\left(P_{x(s)} \cup P_{x_{left}(s)} \cup P_{x_{right}(s)}\right),$$

where C(•) is a convex hull operation on a point set and, in the above-introduced group notation, $P_g = (gP)_x$. (As mentioned above, the convex hull can be generalized to the alpha shape without departing from the scope of this disclosure.) This provides an estimate of a three-dimensional occupied region of space. To estimate a two-dimensional occupied region of space, which may be regarded as the ground projection of the corresponding three-dimensional region, the convex hull is computed while excluding the vertical (z) coordinate.

For a combination of multiple vehicle bodies, as is the case in a vehicle combination of multiple units, the above approach can be generalized straightforwardly as $$V_x = \bigcup_{s,i} V_i(s),$$

where $V_i(s)$ denotes the volume occupied by the body of the ith vehicle unit at point s.

In addition to the intrinsic usefulness of the estimation method 200, the method 200 can be advantageously embedded into a path planning method for multiple AVs. As illustrated in FIG. 2, in an initial step 210, a planned path $X_1$ of a first AV 110. The steps 212, 214, 216, 218 and 220 are then executed to estimate an outer limit of a region of space $A_{X_1}$ occupied by the first AV when it moves along the planned path in operation. On the basis of this outer limit, in a step 222, path planning is then initiated for a second AV 120. Because the outer limit is known, e.g. as a p-confident bound, the path planning for the second AV 120 can be performed both safely and with efficient usage of the available navigable space, to obtain a second planned path $X_2$. The suitable distance d between the planned paths $X_1$, $X_2$ can be chosen so that the respective outer limits are at most contiguous and never overlapping. Optionally, if desired, the planned paths $X_1$, $X_2$ can be additionally separated by an added (predefined) margin do.

Another potential application of the method 200 is to generate an avoidance maneuver, in such manner as to ensure that it causes the vehicle 110 to steer free of an obstacle with a desired probability p.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A computer implemented method for estimating a region of space occupied by a vehicle which moves along a path, the method comprising:

obtaining a nominal path $\{X(s):0\le s\le s_0\}$, which is a curve in two- or three-dimensional cartesian space;

recording a plurality of trajectories in the vehicle's state space $\{x(s;q):0\le s\le s_0\}$ while the vehicle is maneuvered along the nominal path in a variety of driving conditions q;

for each trajectory, computing a corresponding lateral deviation $\{e\ (s;q)=(e_l(s;q),e_r(s;q)):0\le s\le s_0\}$ off the nominal path;

estimating a conditional probability distribution $F_{e(s)|X(s)}$ of the lateral deviation given the nominal path;

based on the estimated probability distribution, providing an outer limit of a region of space $A_X$ occupied by the vehicle which moves along the nominal path, wherein the computing of the lateral deviation and/or the providing of the outer limit is based on a two- or three-dimensional point set constituting a footprint (II) of the vehicle; and controlling the vehicle based on the outer limit to maintain a safety margin.

2. The method of claim 1, wherein the outer limit is a p-confident upper bound on the occupied region of space for a predefined confidence level p.

3. The method of claim 2, wherein providing the p-confident upper bound includes evaluating a Pareto-type distribution.

4. The method of claim 1, wherein providing the outer limit includes computing an upper bound on the lateral deviation at a plurality of points along the nominal path.

5. The method of claim 4, wherein:

the lateral deviation is independent of the footprint of the vehicle; and providing the outer limit further includes applying the footprint of the vehicle to the upper bound.

6. The method of claim 5, wherein the footprint is applied by a superposition operation and/or a convolution operation.

7. The method of claim 5, wherein providing the outer limit further includes applying the footprint to the nominal path.

8. The method of claim 6, wherein providing the outer limit further includes forming a convex hull or an alpha shape.

9. The method of claim 1, wherein the state space of the vehicle includes orientation.

10. The method of claim 1, wherein the driving conditions differ by at least one of: weather, precipitation, temperature, wind speed, road friction, lighting, load, radio conditions, hardware health, time elapsed since calibration.

11. The method of claim 1, wherein: the vehicle is a vehicle combination of at least two vehicle units with respective footprints, the method comprising:

recording each trajectory of said plurality of trajectories for all vehicle units jointly;

executing the steps of computing the lateral deviation, estimating the conditional probability distribution and providing the outer limit independently for the respective vehicle units; and using the locally outermost one of the respective outer limits as an outer limit of the region of space occupied by the vehicle combination.

12. The method of claim 1, wherein the region of space is two-dimensional or three-dimensional.

13. The method of claim 1, wherein said recording includes performing measurements on a vehicle which is automatically controlled according to a control strategy implemented as an optimal control problem that is subject to a penalty for deviating from the nominal path.

14. The method of claim 1, further comprising:

obtaining a further nominal path $\{\tilde{X}(s):0\le s\le s_0\}$; and based on the already estimated conditional probability distribution $F_{e(s)|X(s)}$ of the lateral deviation given the nominal path X(s), providing an outer limit of a region of space $A_{\tilde{X}}$ occupied by the vehicle which moves along said further path.

15. A method for facilitating path planning of multiple autonomous vehicles, AVs, the method comprising:

obtaining a planned path $X_1$ of a first AV;

using the method of claim 1, estimating an outer limit of a region of space $A_{X_1}$ occupied by the first AV when it moves along the planned path; and on the basis of the outer limit, initiating non-colliding path planning for a second AV.

16. A non-transitory computer readable medium storing computer program comprising instructions which, when the program is executed by a computer, cause the computer to carry out the method of claim 1.

17. A device comprising non-transitory memory and processing circuitry configured to perform the method of claim 1.

* * * * *